United States Patent [19]

Moskowitz

[11] Patent Number: 4,766,004

[45] Date of Patent: Aug. 23, 1988

[54] CRUNCHY, HIGHLY PALATABLE, BULK-INCREASING, DIETARY FIBER SUPPLEMENT COMPOSITION

[75] Inventor: Alan H. Moskowitz, Budd Lake, N.J.

[73] Assignee: Warner-Lambert Company, Morris Plains, N.J.

[21] Appl. No.: 944,144

[22] Filed: Dec. 19, 1986

[51] Int. Cl.[4] ............................................... A23L 1/29
[52] U.S. Cl. ................................... 426/658; 424/439; 426/613; 426/618; 426/804
[58] Field of Search .................. 426/93, 804, 631, 658; 424/439

[56] References Cited

U.S. PATENT DOCUMENTS

| | | | |
|---|---|---|---|
| 1,654,548 | 1/1928 | McLaughlin | 424/442 |
| 4,348,379 | 9/1982 | Kowalsky et al. | 426/804 X |
| 4,421,771 | 12/1983 | Stock et al. | 426/549 X |
| 4,565,702 | 1/1986 | Morley et al. | 426/804 X |
| 4,568,557 | 2/1986 | Becker et al. | 426/618 |

FOREIGN PATENT DOCUMENTS

| | | |
|---|---|---|
| 0068229 | 1/1983 | European Pat. Off. . |
| 2746479 | 4/1979 | Fed. Rep. of Germany . |
| 53-081662 | 7/1978 | Japan . |
| 53-081663 | 7/1978 | Japan . |
| 58-067153 | 4/1983 | Japan . |
| 58-098042 | 6/1983 | Japan . |

*Primary Examiner*—Donald E. Czaja
*Assistant Examiner*—Celine Callahan
*Attorney, Agent, or Firm*—Ann M. Kelly; Henry C. Jeanette; Sandra Gusciora Field

[57] ABSTRACT

A crunchy, highly palatable, bulk-increasing, dietary fiber supplement composition which contains whole psyllium husks having a particle size of from about 12 to about 70 mesh, U.S. Standard Sieve, a palatable food-grade vegetable fat which is solid at room temperature, a sweetening agent, and at least one flavoring agent.

23 Claims, No Drawings

4,766,004

CRUNCHY, HIGHLY PALATABLE, BULK-INCREASING, DIETARY FIBER SUPPLEMENT COMPOSITION

FIELD OF THE INVENTION

The present invention relates to a crunchy, highly palatable, bulk-increasing, dietary fiber supplement composition. More particularly, this invention relates to a dietary supplement composition containing whole psyllium husks, a food-grade vegetable fat which is solid at room temperature, a sweetening agent and a flavoring agent. The whole psyllium husks range in size from about 12 to 70 mesh and, when incorporated into a sweetened, flavored, food-grade vegetable fat at a certain level, provide a crunchiness which makes a high-fiber product appealing as well as efficacious. In a further embodiment, dietary fibers other than those derived from whole psyllium husks may be additionally included in the bulk-increasing dietary supplement composition of this invention.

BACKGROUND OF THE INVENTION

Chocolate or carob covered food and granola bars are known and sold commercially. Such products generally contain an admixture of nuts and grains, bound together with an edible material such as peanut butter and/or a sweetening agent, which admixture is formed into a bar or any desired shape and subsequently coated with a thin layer of chocolate or carob.

For example, U.S. Pat. No. 4,421,771 to Stock et al., discloses chocolate covered nutrient bars, wherein a fibrous vegetable filling material having a relatively high water content, is enclosed by waffles, wafers, or biscuits, after which the entire product is covered with a thin layer of chocolate. The vegetable fiber may be whole wheat bran and the filling may include honey, fruits, fruit jellies, or jams.

German Federal Republic Patent Application No. 2,746,479 to Charlet et al., concerns confectionery bars such as chocolate bon-bons, etc, whereby shredded bran or vegetable fiber is added in an amount of 5% to 75% by weight. The presence of the bran or vegetable fiber, which may be used in the form of a finely divided powder or coarse granulate, is said to be beneficial to a consumer's health and well-being.

U.S. Pat. No. 4,565,702 to Morley, et al., discloses a chocolate covered fiber snack bar wherein the fiber core contains an insoluble dietary fiber coated or enrobed with a soluble dietary fiber. The insoluble dietary fiber is derived from a cereal bran and the soluble dietary fiber may be gum arabic, tragcanth, karaya ghatti, agar, alginates, carrageenans, furcallan, psyllium, galactoman, and mixtures thereof.

Other known food and snack products are formulated to contain textured food material and/or fiber admixed with chocolate.

For example, Japanese patent application No. 53081662 and Japanese patent application No. 53081663 to Fuji, disclose soft confectionery products containing textured protein, which are used in the preparation of snack foods or as ingredients in chocolate balls, cookies, breads, etc. The soft confectionery products may additionally contain a fiber material.

In Japanese patent application No. 58098042, to Miyahara, powdered broad-leaved tree wood and walnut shell powder are combined and added to confectioneries, (such as chocolate or caramel) or to protein foods, (such as ham or sausage) to increase the vegetable fiber content of such confectioneries and foods.

Japanese patent application No. 58067153, to Kimura, discloses the admixture of rice bran with chocolate, sugars, bread, candy, tea, etc. to provide nutritious products which good are for the health.

U.S. Pat. No. 1,654,548 to McLaughlin et al., discloses globules of cocoa encapsulated in an admixture of an edible vegetable albumin and sugar. The vegetable albumin is derived from coconut. The encapsulated globules of cocoa are added to cocoa butter to provide a finished chocolate of improved flavor and digestibility.

U.S. Pat. No. 4,568,557, to Becker et al., discloses a snack food product prepared by premixing a dietary fiber with a food grade oil; premixing a compound coating containing a fractionated fat, sweetener, milk solids, yogurt, and a flavoring agent; blending the two pre-mixtures and adding a cereal product to obtain texture and a dried fruit or nut for flavor; and extruding the resulting mixture into a desired shape.

The use of fiber supplements as bulk laxatives or for bowel normalization is also known in the art. Products which provide approximately 5 grams of corn or wheat fiber per supplement are sold commercially. In additional, natural fiber laxative products containing psyllium, a bulk producing dietary fiber, are also known in the art and available commercially. For example, a thin wafer which contains psyllium as well as other fibers such as wheat bran and oat bran is commercially available. Another well-known commercially available bulk laxative product provides granules of psyllium which are admixed with water prior to ingestion.

European patent application No. 0068229, to Kleinert, discloses the addition of the seed coats (episperm) of cocoa beans in finely powdered form, to dough, bread, snacks, and chocolate to increase bulk and stimulate the intestinal tract.

U.S. Pat. No. 4,348,379, to Kowalsky, discloses a dietetic composition for natural digestion regulation containing whole fleawort seeds (Semen psyllii totum) whole linseed, wheat bran, lactose, a binding agent based on natural rubber, flavor and food color additives. The preferred binding agent is gum arabic.

Thus, a variety of fiber materials have been admixed with fat-containing ingredients such as chocolate or food-grade oils to provide snack products which are considered healthful.

In addition, non-fibrous materials (such as crisp rice which is a puffed, baked product) have been admixed with chocolate to provide an appealing crunchy texture. And psyllium fibers in powdered or in seed form have been admixed with other fibers to provide bulk laxatives or products which are said to stimulate the natural digestive processes. However, the taste of most products containing a sufficient amount of fiber to be efficacious continues to be a problem. Thus, it is quite surprising that whole psyllium husks, when admixed with a flavored, sweetened, food-grade vegetable fat, at efficacious levels, will provide a crunchy dietary fiber supplement composition with an especially appealing texture.

SUMMARY OF THE INVENTION

This invention relates to a crunchy, highly palatable, bulk-increasing, dietary fiber supplement composition comprising about 2% to about 30% by weight of whole psyllium husks having a particle size of from about 12 to about 70 mesh, wherein at least about 25% to about 95%, preferably about 40% to about 90% by weight are in the about 12 to about 30 mesh size range; about 22.9% to about 40% by weight of a food-grade vegetable fat which is solid at room temperature; about 25% to about 75% by weight of a sweetening agent; and about 0.1% to about 25% by weight of at least one flavoring agent, all percentages being by weight, based on the weight of the total composition. In a further embodiment of the invention, there is additionally present in the dietary fiber supplement composition from about 2% to about 28% by weight, based on the weight of the total composition, of a dietary fiber, other than whole psyllium husks, which additional fiber may include fruit fiber, grain fiber, vegetable fiber, cellulose fiber, water-soluble gums and mixtures thereof.

The crunchy, highly palatable, bulk-increasing, dietary fiber supplement composition of this invention is prepared by mixing a melted food-grade vegetable fat, which is solid at room temperature, with a sweetening agent and at least one flavoring agent until a viscous liquid is obtained; adding whole psyllium husks having a particle size ranging from about 12 to about 70 mesh to the viscous liquid and mixing until a homogenous mixture is obtained; allowing the homogenous mixture to cool slightly, molding the mixture into a desired shape and allowing it to cool and harden. In the embodiment in which a dietary fiber other than whole psyllium husks is included, such dietary fiber is also added to the viscous melted liquid and processing is continued, as described.

DETAILED DESCRIPTION OF THE INVENTION

The appealing crunchiness and bulk-forming properties of the dietary fiber supplement composition of the present invention are provided by whole psyllium husks. Psyllium husks are described in the United States Pharmacopeia, Volume 21, as the cleaned, dried seed coat which is separated by winnowing and thrashing from the seeds of Plantago ovata Forskal, known in commerce as Blond Psyllium, Indian Psyllium or Ispaghula; or from Plantago psyllium Linne or from Plantago indica Linne (Plantago arenaria Waldstein and Kitaibel), known in commerce as Spanish or French Psyllium. Both the psyllium seed and psyllium husks are classified as bulk forming laxatives, that is, as agents which increase the bulk volume and water content of the stool, thereby promoting bowel movement. Psyllium husks are commercially available in whole or in powdered form. The whole psyllium husks, when separated from psyllium seeds by commonly used processes, range in size from about 12 mesh to about 70 mesh. The mesh size in this instance is the United States Standard Sieve Series wherein the sieve or mesh number refers to the number of meshes to a linear inch of the sieve through which the particles being described will pass. Particles designated 8 to 20 mesh are generally considered very coarse to coarse.

For purposes of this invention, the term whole psyllium husks includes unground husks as they are separated from the seed, wherein the whole husks range in size from about 12 mesh to about 30 mesh; and the husk fragments, which are included in the commercially available product, range in size from about 30 mesh to about 70 mesh.

In the practice of this invention, whole psyllium husks having a particle size ranging from about 12 to about 70 mesh, wherein at least about 25% to about 95%, preferably about 40% to about 90% by weight, based on the weight of the husks, are in the about 12 to about 30 mesh size range, may be utilized to provide the crunchy texture which consumers find especially appealing. Whole psyllium husks ranging in size from about 12 to about 30 mesh are preferred, since they provide more crunch at any particular concentration.

It is critical to use whole psyllium husks having a particle size within the above ranges at a certain level of concentration in order to obtain the desired crunchy quality. Thus, the whole psyllium husks must be present in a minimum amount of about 2% by weight, based on the weight of the total dietary supplement composition, in order to achieve a crunchy texture which appeals to consumers. Furthermore, it has been found that inventive compositions containing levels of whole psyllium husks in an amount in excess of 30% by weight, based on the weight of the total dietary supplement composition, become unpalatable and begin to display the dry, dusty, fibrous, straw-like mouthfeel characteristic of most bulk laxative or dietary fiber compositions. Thus, in the practice of this invention, it is essential to utilize about 2% to about 30% by weight, based on the weight of the total composition, of whole psyllium husks within the critical particle size range described above, in order to obtain the benefits of crunchy good taste together with bulkforming properties.

At lower levels, such as about 2% to about 3% by weight of the whole psyllium husks, based on the weight of the total composition, it is preferable to use whole psyllium husks ranging in size from about 12 to about 30 mesh, in order to provide crunch, since husks of larger size provide more crunch. At concentrations of about 3% and above by weight, whole psyllium husks having a particle size of about 12 to about 70 mesh, will provide crunch. Thus whole psyllium husks present in an amount of from about 3% to about 30% by weight are preferred, while amounts of from about 9% to about 27% by weight, based on the weight of the total composition are more preferred, and about 12% to about 22% are most preferred. As will be more fully discussed below, the amount of whole psyllium husks used in practice of this invention in excess of the 2% by weight amount which is required to obtain crunch, will depend, on such factors as the amount of other dietary fiber present, the amount of laxation desired, and the amount of fiber supplementation desired.

The next critical ingredient used in the dietary supplement composition of this invention is a food-grade vegetable fat which is solid at room temperature (24° C.). Although many fats fall into this category, it has been found that fats commercially available for use in food products which are suitable for inclusion in the dietary supplement composition of this invention generally include food-grade vegetable fats which are substantially solid at room temperature such as cocoa butter, palm kernel oil, and palm oil; and a number of other hard butters or vegetable oils which have been fractionated, hydrogenated or partially hydrogenated to make such oils solid at room temperature. Typically, such hardened vegetable oils which are suitable for use in the practice of this invention include hardened coconut oil, cottonseed oil, soybean oil, and the like. Mixtures of aforementioned naturally hard butters and hardened vegetable oils are also suitable for use in the practice of this invention. The preferred food-grade vegetable fats include cocoa butter and other vegetable fats and oils which, after treatment, have the following general characteristics: a distinct brittle fracture below about 20° C., a fairly sharp, complete melting at about 35° C., with an incipient fusion or softening at about 30° C. to about 32° C.

The amount of food grade fat utilized is from about 22.9% to about 40% by weight, preferably from about 26% to about 34%, most preferably from about 28% to about 32% by weight, based on the weight of the total composition.

As a practical matter, hardened food-grade fats (other than cocoa butter), are commercially available in the form of what is known as "compound coatings" or "confectionery coatings." Compound coatings and/or confectionery coatings, are terms of art familiar to those who formulate food products and contain, as essential ingredients, a hardened fat, a sweetener and flavoring material. Compound coatings and confectionery coatings also contain a number of non-essential optional materials including emulsifiers, food acidulents, salt, and like additives. There are a number of compound coatings for which particular standards of identity have been established, such as sweet chocolate, milk chocolate, buttermilk chocolate, skim milk chocolate, mixed diary products, sweet cocoa and vegetable fat coating, sweet chocolate and vegetable fat coating, and milk chocolate and vegetable fat coating. All such confectionery and compound coatings are suitable for use in the practice of this invention, provided that from about 22.9% to about 40% by weight of vegetable fat is provided, based on the total weight of the dietary fiber supplement composition. As will be seen in the examples set forth below, additional vegetable fat may be added, if necessary, to commercially available compound coatings during the preparation of the crunchy dietary supplement composition of this invention. It should be noted that, in commercially available compound coatings and confectionery coatings containing a mixture of vegetable fats or butters, the individual oils, and/or their concentrations, in such mixture may vary depending on the availability and price of vegetable oils at the time the compound coating is being manufactured.

The sweetening agent ingredient used in the practice of this invention may be selected from a wide range of materials, including water-soluble sweetening agents, water-soluble artificial sweetening agents, and dipeptide based sweeteners, including mixtures thereof. Without being limited to particular sweetening agents, representative illustrations encompass:

A. Water-soluble sweetening agents such as monosaccharides, disaccharides, and polysaccharides such as xylose, ribose, glucose, mannose, galactose, fructose, dextrose, sucrose, maltose, partially hydrolyzed starch or corn syrup solids and sugar alcohols such as sorbitol, xylitol, mannitol and mixtures thereof;

B. Water-soluble artificial sweeteners such as the soluble saccharin salts, i.e., sodium or calcium saccharin salts, cyclamate salts, acesulfam-K and the like, and the free acid form of saccharin; or C. Dipeptide based sweeteners such as L-aspartyl-L-phenylalanine methyl ester and materials described in U.S. Pat. No. 3,492,131 and the like. In general, the amount of sweetener is primarily a matter of taste preference and will vary with the sweetener selected and with the ingredients in the composition being prepared.

The water-soluble sweeteners described in category A above are preferably used in amounts of about 25% to about 75% by weight, and most preferably from about 35% to about 55% by weight, based on the weight of the total dietary fiber supplement composition. Generally speaking a disaccharide, particularly sugar, is preferred since it also provides bulk and texture to the dietary supplement composition of this invention.

In those instances where the sweetening agent chosen does not provide bulk, such as where artificial sweeteners are used, the term sweetening agent, for purposes of this invention, is meant to include artificial sweeteners and bulking agents. Typical bulking agents such as maltodextrin, polydextrose, and the like, are utilized in amounts of about 25% to about 72.5% by weight, together with one or more of the artificial sweeteners described in Categories B and C above, which artificial sweeteners are utilized in amounts of about 0.005% to about 5.0%, most preferably about 0.05% to about 2.5% by weight, based on the weight of the total dietary fiber supplement compositions. The artificial sweeteners and the bulking agents generally provide approximately equivalent levels of bulk and sweetness as do the saccharide type of sweeteners from category A above. Thus, about 25% to about 75%, preferably about 35% to about 55% by weight of one or more sweetening agents, based on the weight of the total dietary fiber supplement composition, are used in the practice of this invention. The amounts of sweetening agents described above are ordinarily necessary to achieve a desired level of sweetness independent of the flavor level achieved from the inclusion of flavoring agents.

Flavoring agents well-known in the food and confectionery art are utilized in the dietary supplement composition of this invention. Typically, such flavors include cocoa powder; carob powder; peanut powder; natural or synthetic fruit flavors such as dried fruit or dehydrated fruit juices, citrus oils and fruit essences; flavor oils such as cinnamon oil or mint oils; and milk products such as whole milk powders, yogurt powder and the non-fat variations thereof. At least one of aforementioned flavoring agents is included in the dietary supplement composition of the invention in amounts of about 0.1% to about 25%, most preferably about 0.5% to about 20%, by weight, based on the weight of the total supplement composition, and depending to a large extent on the type of flavor being used.

In one embodiment of this invention, the inclusion of an additional dietary fiber other than whole psyllium husks is contemplated. The aforementioned dietary fiber may be a fruit fiber, a grain fiber, a vegetable fiber, a cellulose fiber, water-soluble gums or mixtures thereof, and it may be used in the dietary supplement composition of this invention in amounts ranging from about 2% to about 28%, preferably about 6% to about 11%, most preferably about 8% to about 9% by weight, based on the weight of the total dietary fiber supplement composition. The preferred additional dietary fibers are those which have a high dietary fiber content and which are known to be beneficial to health such as corn bran, wheat bran, soy fiber, guar gum and mixtures thereof.

Other food additives, well known to those skilled in the art, may be incorporated into the dietary supplement composition of this invention to achieve certain effects, including emulsifiers, preservatives, coloring agents, and the like.

Fiber has been mentioned as having possible value in a variety of preventative medical areas, such as constipation, weight reduction, diverticulitis, cardiovascular disease and cancer. However, different fiber components have very different physiological functions and the daily level of a particular dietary fiber recommended to achieve physiological effects will vary with the type of fiber ingested. For a bulk laxative effect, a dietary dosage of psyllium fiber, whether it be derived from psyllium seeds or psyllium husks, in an amount of from about 5 to 30 grams is recommended. In accordance with the practice of this invention, dietary supplement compositions may be prepared in units of about 1 to about 1.3 ounces which will contain about 5 grams of psyllium fiber. If minimal bulk laxative effects are desired, it is possible to include the minimum amount of whole psyllium husks necessary to achieve the desired crunchy texture characteristic of the supplement compositions of this invention, and up to about 28% by weight, based on the weight of the total supplement composition, of additional dietary fibers, other than whole psyllium husks which have other beneficial attributes. Thus, the crunchy, highly palatable, dietary fiber supplement compositions of this invention also serve as a vehicle for a variety of dietary fibers which may be recommended for particular medical applications.

The crunchy texture of the dietary fiber supplement compositions of this invention is quite surprising since whole psyllium husks, when placed in water or ingested directly, develop a mushy, pulp-like texture rather than the crunchy texture which is appealing to consumers. Thus, it is totally unexpected that whole psyllim husks, when admixed with a flavored, sweetened, food-grade vegetable fat at certain concentrations, will provide crunch.

The crunchy, highly palatable, dietary fiber supplement composition of this invention is prepared by melting the vegetable fat, sweetener and flavor ingredients at a temperature of from about 40° C. to about 50° C., using conventional means, such as a convection oven, hot water bath, a microwave oven or the like. If a compound or confectionery coating is used to provide the vegetable fat, sweetening agent, and flavoring agent ingredients, no further processing other than heating, as described, is required. However, if a commercial compound or confectionery coating is not utilized, the vegetable fat, sweetening agent and flavoring agent ingredients generally should be refined to reduce the particle size of the individual ingredients, using practices well-known to those skilled in the art of preparing compound or confectionery coatings. The whole psyllium husks are added to the melted mass, with mixing, and mixing is continued until a homogeneous mixture is obtained. If additional dietary fibers other than whole psyllium husks are to be included, they may be added together with the psyllium husks or before or after the husks are added. The order of addition is not critical but mixing is continued until a homogeneous mixture is obtained.

If necessary, a sufficient amount of a vegetable fat or a compatible vegetable oil may be added to decrease the viscosity of the homogenous mixture. In addition, the mixture may be reheated during processing to prevent excessive cooling. When mixing is complete, the homogenous mixture is allowed to cool slightly, with stirring. If chocolate is used as the vegetable fat, it is preferable to add chocolate shavings during the cooling and stirring process as a "seed" to temper the chocolate, as is well-known in the art. The homogeneous mixture is then deposited in molds and refrigerated. When the molded product has hardened, it is removed from the mold.

The advantages of this invention may be further appreciated by reference to the following examples. These examples are intended to illustrate preferred embodiments and are by no means intended to limit the effective scope of the claims. All percents are by weight of the total dietary supplement composition unless otherwise specified.

EXAMPLE 1

Cocoa/Vegetable Fat Confectionery Coating Plus Psyllium Husk Fiber 230 grams of a commercially available confectionery coating (29.5% fractionated palm kernel oil, 45% sugar, 12.5% cocoa powder, 0.1% vanillin, 0.4% soy lecithin, 7% whole milk powder and 5.5% non-fat dry milk) containing 71.3 grams of fat, is melted at about 50° C. in a microwave oven. 60 grams of whole psyllium husks having a particle size between 12–70 mesh U.S. Standard Sieve (approximately 40% having a particle size between 12–30 mesh, U.S. Standard Sieve), are mixed with the melted confectionery coating. 20 grams of palm kernel oil is added to obtain a more fluid texture and mixing is continued until a homogenous mixture is obtained. The mass is then allowed to cool to 33° C. to 38° C., with occasional stirring. The mass is then deposited into molds which have been warmed to room temperature. The molds are refrigerated to set the chocolate, followed by demolding. The products obtained have a crunchy mouthfeel and are highly palatable. Based upon the dietary fiber content of the psyllium husks, which is 89%, the product contains 17.2% dietary fiber and will provide 4.8 grams of dietary fiber per 1 oz. serving.

The following confectionery or compound coatings are utilized in the remaining examples:

A. Sweet Chocolate Compound Coating (50.5% sugar, 37% chocolate liquor, 12% cocoa butter, 0.4% soy lecithin and 0.1% vanilla) contains 31% fat.

B. Apple Cinnamon Flavor Compound Coating—contains 53% to 56% sugar, 31% to 34% fat, 0.5% to 1.5% citric acid, 0.1% to 1.0% lecithin, 0.01% to 0.5% salt, 9% to 11% non-fat dry milk and 0.1 to 0.8% apple cinnamon flavor.

C. Peanut Flavored Compound Coating—contains 26%–28% sugar, 26%–30% fat, 0.1% to 0.3% salt, 11%–14% non-fat dry milk, 24%–27% defatted peanut flour, 2% to 4% dextrose, 1% to 2% peanut butter and 0.6% to 0.9% emulsifier.

D. Raspberry Flavored Yogurt Compound Coating—contains 52% to 55% sugar, 31% to 34% fat, 0.5% to 1.5% citric acid, 0.1% to 1.0% lecithin, 0.5% to 0.15% salt, 3% to 5% non-fat dry milk, 0.3% to 1% flavor, 5% non-fat yogurt solids, and 0.5% to 1.5% dried raspberry juice.

Following the procedure of Example 1, inventive dietary fiber supplement compositions are prepared containing the amounts of ingredients shown above for Examples 2–6. In Examples 2 and 6, the chocolate shavings are added after cooling, with mixing, and processing is then continued as in Example 1. The products of Examples 2–5 were evaluated and found to have a crunchy mouthfeel and to be highly palatable. The product of Example 6 was crunchy, although not as crunchy as the products of Examples 2–5, but much better tasting than the comparative product of Example 9. The Example 9 product also contained corn bran, medium grind, but did not contain whole psyllium husks.

Examples 2-6

| Ingredients | Ex. 2 | Ex.3 | Ex.4 | Ex. 5 | Ex.6 |
|---|---|---|---|---|---|
| | | | Amounts In Grams | | |
| Whole Psyllium Husk* | 990 | 50 | 50 | 50 | 40 |
| Coating A | 3660 | | | | 384 |
| Coating B | | 248 | | | |
| Coating C | | | 259 | | |
| Coating D | | | | 250 | |
| Cocoa Butter | 300 | | | | 20 |
| Vegetable fat | | 5 | | 5 | |
| Chocolate shavings | 120 | | | | 12 |
| Corn bran, medium grind | | | | | 44 |
| % Dietary fiber | 17.6% | 14.8% | 14.8% | 14.8% | 14.2% |

*Particle size ranging from 12-70 mesh, U.S. Standard Sieve (approximately 40% having a particle size between 12-30 mesh, U.S. Standard Sieve).

EXAMPLE 7

This example demonstrates the amount of whole psyllium husks required to provide the appealing crunchy texture of the inventive dietary fiber supplement composition.

| Ingredients | I | II | III | IV |
|---|---|---|---|---|
| | | Amounts In Grams | | |
| Compound Coating of Example 1 | 52 | 58 | 60 | 61 |
| Whole Psyllium husks* | 10 | 4 | 2 | 1 |
| Total Compositions Wt. | 62 | 62 | 62 | 62 |

*Particle size 12-70 mesh, U.S. Standard Sieve (approximately 40% having a particle size of 12-30 mesh, U.S. Standard Sieve).

The procedure of Example 1 is followed. The formulations were evaluated after demolding. Formulation I had excellent crunch, palatability and dietary fiber content. Formulation II had good crunch but was low in dietary fiber. Formulation III had crunch. The crunch for Formulation IV was barely perceptible, and judged to be unacceptable. This example demonstrates that between 2% and 3% by weight of whole psyllium husks are required to obtain perceptible crunchy texture.

COMPARATIVE EXAMPLES 8-13

The following examples demonstrate that not all dietary fibers provide the crunchy, appealing texture of the inventive dietary supplement composition. All mesh sizes are U.S. Standard Sieve. All corn bran contains 80% dietary fiber. The psyllium husk contains 89% dietary fiber and the oat contains 80% dietary fiber.

EXAMPLES 8-13

| Ingredients | Ex. 8 | Ex. 9 | Ex. 10 | Ex. 11 | Ex. 12 | Ex. 13 |
|---|---|---|---|---|---|---|
| | | | Amounts In Grams | | | |
| Compound Coating of Example 1 | 235 | 235 | 230 | 230 | 105 | 224 |
| Palm Kernel Oil | 5.0 | 5.0 | 10.0 | 20.0 | 5.5 | 10.0 |
| Soya Lecithin | 0.5 | 0.5 | 0.5 | 0.6 | - | 1.0 |
| Corn bran, regular 20-60 mesh | 60.0 | | | | | |
| Corn bran, medium 60-100 mesh | | 60.0 | | | | |
| Corn bran, fine, 60 mesh | | | 60.0 | | | |
| Corn bran, ultra fine 100-200 mesh | | | | 60.0 | | |
| Psyllium husk, powdered 40 mesh | | | | | 25.3 | |
| Oat fiber, 60 mesh | | | | | 66.2 | |
| % Dietary fiber | 16% | 16% | 16% | 15.4% | 16.6% | 17.6% |

The procedure of Example 1 is followed, substituting the fiber specified in each of Examples 8 to 13 for the whole psyllium husks of Example 1. After demolding, each product was evaluated, as follows:

Example 8 product—the bran taste lingers in the mouth, the product is very gritty and straw-like, and there is no perceptible crunch.

Example 9—there is no crunch, and the product is slightly gritty.

Example 10—the product is smooth, not gritty and there is no crunch. Fine particles coat the mouth and throat, leaving a very unpleasant sensation.

Example 11—the same evaluation as Example 10.

Example 12—there is no crunch and fine particles coat the mouth and throat.

Example 13—there is no crunch and the product has a sandy texture which is very unpleasant.

The invention being thus described, it will be obvious that the same may be varied in many ways. Such variations are not to be regarded as a departure from the spirit or scope of the invention and all such modifications are intended to be included within the scope of the claims.

What is claimed is:

1. A crunchy, highly palatable, bulk-increasing, dietary fiber supplement composition comprising:
   (a) from about 2% to about 30% by weight, based on the weight of the total composition, of whole psyllium husks having a particle size ranging from about 12 to about 70 mesh, U.S. Standard Sieve, wherein about 25% to about 95% of the whole psyllium husks are in the particle size range of about 12 to about 30 mesh, U.S. Standard Sieve;
   (b) from about 22.9% to about 40% by weight, based on the weight of the total composition, of a palatable, food-grade vegetable fat which is solid at room temperature;
   (c) from about 25% to about 75% by weight, based on the weight of the total composition, of a sweetening agent and;
   (d) from about 0.1% to about 25% by weight based on the weight of the total composition, of at least one flavoring agent.

2. The composition of claim 1 wherein the whole psyllium husks are present in an amount of from about 9% to about 27% by weight, based on the weight of the total composition.

3. The composition of claim 1 wherein the food-grade vegetable fat has the following characteristics: brittle fracture below about 20° C.; sharp, complete melting at about 35° C.; and fusion or softening at about 30° C. to about 32° C.

4. The composition of claim 3 wherein the food-grade vegetable fat is cocoa butter.

5. The composition of claim 4 wherein the cocoa butter is present in an amount of from about 28% to about 32% by weight, based on the weight of the total composition.

6. The composition of claim 3 wherein the food-grade vegetable fat is a combination of a fractionated palm kernal oil and a hydrogenated palm oil.

7. The composition of claim 6 wherein the food-grade vegetable fat is present in an amount of from about 26% to about 34% by weight, based on the weight of the total composition.

8. The composition of claim 1 wherein the sweetening agent is selected from the group consisting of sucrose, fructose, dextrose, lactose, sorbitol, mannitol, corn syrup solids, and mixture thereof.

9. The composition of claim 8 wherein the sweetening agent is sugar.

10. The composition of claim 9 wherein the sugar is present in an amount of from about 35% to about 55% by weight, based on the weight of the total composition.

11. The composition of claim 1 wherein there is additionally present from about 2% to about 28% by weight, based on the weight of the total composition, of a dietary fiber other than whole psyllium husks selected from the group consisting of fruit fibers, grain fibers, vegetable fibers, cellulose fibers, water-soluble gums, and mixtures thereof.

12. The composition of claims 1 or 11 wherein the flavoring agent is selected from the group consisting of cocoa powder, carob powder, peanut powder, yogurt powder, whole milk powder, vanilla, natural fruit flavors, artificial fruit flavors, natural flavor oils, artificial flavor oils, and mixtures thereof.

13. The composition of claims 1 to 11 wherein the flavoring agent is cocoa powder, present in and amount of from about 0.5% to about 20% by weight, based on the weight of the total composition.

14. The composition of claims 1 or 11 wherein the flavoring agent is a combination of cinnamon and apple flavor, present in an amount of from about 0.5% to about 20% by weight, based on the weight of the total composition.

15. The composition of claims 1 or 11 wherein the flavoring agent is a combination of raspberry flavor and yogurt, present in an amount of from about 0.5% to about 20% by weight, based on the weight of the total composition.

16. The composition of claims 1 or 11 wherein the flavoring agent is peanut powder present in an amount of from about 0.5% to about 20% by weight, based on the weight of the total composition.

17. The composition of claim 11 wherein the whole psyllium husks are present in an amount of from about 9% to about 27% by weight, based on the weight of the total composition.

18. The composition of claim 11 wherein the food-grade vegetable fat has the following characteristics: brittle fracture below about 20° C.; sharp, complete melting at about 35° C.; and fusion or softening at about 30° C. to about 32° C.

19. The composition of claim 18 wherein the vegetable fat is present in an amount of from about 26% to about 34% by weight, based on the weight of the total composition.

20. The composition of claim 11 wherein the dietary fiber other than whole psyllium husks is selected from the group consisting of corn bran, wheat bran, and mixtures thereof.

21. The composition of claim 20 wherein the dietary fiber other than whole psyllium husks is present in an amount of from about 6% to about 11% by weight, based on the weight of the total composition.

22. A crunchy, highly palatable, bulk-increasing, dietary fiber supplement composition comprising:
   (a) from about 12% to about 22% by weight, based on the weight of the total composition, of whole psyllium husks having a particle size ranging from about 12 to about 70 mesh, U.S. Standard Sieve, wherein about 25% to about 95% of the whole psyllium husks are in the particle size range of about 12 to about 30 mesh, U.S. Standard Sieve;
   (b) from about 28% to about 32% by weight, based on the weight of the total composition, of a food-grade vegetable fat having the following characteristics: brittle fracture below about 20° C.; sharp, complete melting at about 35° C.; and fusion or softening at about 30° C. to about 32° C.;
   (c) from about 35% to about 55% by weight, based on the weight of the total composition, of a sweetening agent selected from the group consisting of sucrose, fructose, dextrose, lactose, sorbitol, mannitol, corn syrup solids and mixtures thereof;
   (d) from about 8% to about 9% by weight, based on the weight of the total composition, of an additional dietary fiber selected from the group consisting of corn bran, wheat bran, and mixtures thereof; and
   (e) from about 0.5% to about 20% by weight, based on the weight of the total composition, of at least one flavoring agent.

23. A crunchy, high palatable, bulk-increasing, dietary fiber supplement composition comprising:
   (a) from about 12% to about 22% by weight, based on the weight of the total composition, of whole psyllium husks having a particle size ranging from about 12 to about 70 mesh, U.S. Standard Sieve, wherein about 25% to about 95% of the whole psyllium husks are in the particle size range of about 12 to about 30 mesh, U.S. Standard Sieve;
   (b) from about 28% to about 32% by weight, based on the weight of the total composition, of a food-grade vegetable fat having the following characteristics: brittle fracture below about 20° C.; sharp, complete melting at about 35° C.; and fusion or softening at about 30° C. to about 32° C.;
   (c) from about 35% to about 55% by weight, based on the weight of the total composition, of sugar; and
   (d) from about 0.5% to about 20% by weight, based on the weight of the total composition, of at least one flavoring agent.

* * * * *